United States Patent
Seibert et al.

(10) Patent No.: US 9,688,921 B2
(45) Date of Patent: Jun. 27, 2017

(54) OIL QUALITY USING A MICROPOROUS HOLLOW FIBER MEMBRANE

(71) Applicants: Board of Regents, The University of Texas System, Austin, TX (US); Organic Fuels Algae Technologies, LLC, Houston, TX (US)

(72) Inventors: Frank Seibert, Austin, TX (US); Stephen William Briggs, Austin, TX (US); Stacy S. Truscott, Austin, TX (US); Peter B. Kipp, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 458 days.

(21) Appl. No.: 14/052,516

(22) Filed: Oct. 11, 2013

(65) Prior Publication Data
US 2014/0243573 A1    Aug. 28, 2014

Related U.S. Application Data

(60) Provisional application No. 61/769,286, filed on Feb. 26, 2013.

(51) Int. Cl.
| | | |
|---|---|---|
| *C10G 31/09* | (2006.01) | |
| *B01D 61/00* | (2006.01) | |
| *B01D 63/02* | (2006.01) | |

(52) U.S. Cl.
CPC .............. *C10G 31/09* (2013.01); *B01D 61/00* (2013.01); *B01D 63/02* (2013.01);
(Continued)

(58) Field of Classification Search
None
See application file for complete search history.

(56) References Cited

U.S. PATENT DOCUMENTS

| | | |
|---|---|---|
| 2,611,490 A | 9/1952 | Robinson |
| 3,956,112 A | 5/1976 | Lee et al. |
| | (Continued) | |

FOREIGN PATENT DOCUMENTS

| | | |
|---|---|---|
| CA | 2248280 A1 | 10/1998 |
| EP | 0554567 A1 | 8/1993 |
| | (Continued) | |

OTHER PUBLICATIONS

Korean Intellectual Property Office (ISA) International Search Report and Written Opinion for PCT/US2013/046007, dated Oct. 11, 2013, 11 pages.
(Continued)

*Primary Examiner* — Tam M Nguyen
(74) *Attorney, Agent, or Firm* — Kilpatrick Townsend & Stockton LLP

(57) ABSTRACT

The present invention includes methods and systems for improving oil quality of a contaminated oil mixture by removing contaminants from a contaminated oil comprising the steps of: pretreating a membrane contactor system having a first and a second surface with an hydrophobic liquid, wherein the hydrophobic liquid is contacted to at least one of the first and second surfaces; obtaining a contaminated oil that comprises oil and lipophobic contaminants; contacting the contaminated oil onto a first surface of one or more membrane contactors to coalesce the oil on the first surface; and collecting the coalesced oil from the contaminated oil on the second surface of the membrane contactor.

16 Claims, 8 Drawing Sheets

(52) U.S. Cl.
CPC ...... *B01D 2311/02* (2013.01); *B01D 2311/04* (2013.01); *B01D 2323/04* (2013.01); *B01D 2323/46* (2013.01)

(56) References Cited

U.S. PATENT DOCUMENTS

| | | | |
|---|---|---|---|
| 4,309,289 | A | 1/1982 | Head |
| 4,439,629 | A | 3/1984 | Ruegg |
| 4,531,593 | A | 7/1985 | Elliott et al. |
| 4,814,088 | A | 3/1989 | Kutowy et al. |
| 4,846,978 | A | 7/1989 | Leggett et al. |
| 4,886,603 | A | 12/1989 | Taylor |
| 4,933,198 | A | 6/1990 | Lee et al. |
| 4,966,707 | A | 10/1990 | Cussler et al. |
| 5,078,886 | A | 1/1992 | Hsu |
| 5,107,056 | A | 4/1992 | Chen et al. |
| 5,167,824 | A | 12/1992 | Cohen et al. |
| 5,236,474 | A | 8/1993 | Schofield et al. |
| 5,252,220 | A | 10/1993 | Coughlin et al. |
| 5,263,409 | A | 11/1993 | Van Eikeren et al. |
| 5,350,527 | A | 9/1994 | Kitko |
| 5,378,369 | A | 1/1995 | Rose et al. |
| 5,397,369 | A | 3/1995 | Ohishi |
| 5,639,375 | A | 6/1997 | Hiroshi |
| 5,779,889 | A | 7/1998 | Sugiura |
| 5,838,922 | A | 11/1998 | Galand et al. |
| 5,938,922 | A | 8/1999 | Fulk, Jr. et al. |
| 5,951,875 | A | 9/1999 | Kanel et al. |
| 5,954,858 | A | 9/1999 | Peretti et al. |
| 5,989,431 | A | 11/1999 | Evans et al. |
| 6,117,327 | A | 9/2000 | Ciora et al. |
| 6,146,535 | A | 11/2000 | Sutherland |
| 6,187,987 | B1 | 2/2001 | Chin et al. |
| 6,228,146 | B1 | 5/2001 | Kuespert |
| 6,436,290 | B1 | 8/2002 | Glassford |
| 6,471,869 | B1 * | 10/2002 | Yanou .................... B01D 61/14 210/195.2 |
| 6,471,969 | B1 | 10/2002 | Schlachter et al. |
| 6,920,637 | B2 | 7/2005 | Mason et al. |
| 7,186,344 | B2 | 3/2007 | Hughes |
| 8,092,685 | B1 | 1/2012 | Gonzalez et al. |
| 8,110,112 | B2 | 2/2012 | Alburty et al. |
| 8,128,827 | B2 | 3/2012 | Gallo et al. |
| 8,202,425 | B2 | 6/2012 | Kale |
| 8,366,794 | B2 | 2/2013 | Tremblay et al. |
| 8,455,669 | B2 | 6/2013 | Miranda et al. |
| 8,486,267 | B2 | 7/2013 | Seibert et al. |
| 8,491,792 | B2 | 7/2013 | Kipp et al. |
| 8,506,685 | B2 | 8/2013 | Taylor et al. |
| 8,523,981 | B2 | 9/2013 | Huang et al. |
| 9,149,772 | B2 | 10/2015 | Seibert et al. |
| 2003/0185956 | A1 | 10/2003 | Gradley |
| 2004/0200769 | A1 | 10/2004 | Hunsinger |
| 2004/0232046 | A1 | 11/2004 | Tanaka et al. |
| 2005/0098504 | A1 | 5/2005 | Manz et al. |
| 2005/0147757 | A1 | 7/2005 | Roh et al. |
| 2006/0191838 | A1 | 8/2006 | Lowell |
| 2006/0275533 | A1 | 12/2006 | Fletcher et al. |
| 2007/0144716 | A1 | 6/2007 | Doh et al. |
| 2008/0083671 | A1 | 4/2008 | Bomberger et al. |
| 2008/0156191 | A1 | 7/2008 | Parekh et al. |
| 2009/0325269 | A1 | 12/2009 | Marschke |
| 2010/0151098 | A1 | 6/2010 | Catchpole et al. |
| 2010/0173806 | A1 | 7/2010 | Fan et al. |
| 2011/0045528 | A1 | 2/2011 | Dhamwichukorn |
| 2011/0065940 | A1 | 3/2011 | Kahelin et al. |
| 2011/0138682 | A1 | 6/2011 | Demaris et al. |
| 2011/0167712 | A1 | 7/2011 | Brasil |
| 2011/0192792 | A1 | 8/2011 | Chew et al. |
| 2011/0225878 | A1 | 9/2011 | Moulijn et al. |
| 2012/0077255 | A1 | 3/2012 | Miranda et al. |
| 2012/0094340 | A1 | 4/2012 | Morgan |
| 2012/0159839 | A1 | 6/2012 | Koskinen et al. |
| 2012/0208247 | A1 | 8/2012 | Kipp et al. |
| 2012/0226061 | A1 | 9/2012 | Shepherd |
| 2013/0270187 | A1 | 10/2013 | Seibert et al. |
| 2013/0334137 | A1 | 12/2013 | Seibert et al. |
| 2014/0131279 | A1 | 5/2014 | Seibert et al. |
| 2015/0087877 | A1 | 3/2015 | Seibert et al. |

FOREIGN PATENT DOCUMENTS

| | | |
|---|---|---|
| EP | 1270063 A2 | 1/2003 |
| EP | 1859852 A1 | 5/2007 |
| JP | 2007209955 A | 8/2007 |
| WO | 9845019 A1 | 10/1998 |
| WO | 0166910 A1 | 9/2001 |
| WO | 2005/100542 A1 | 10/2005 |
| WO | 2009094440 A1 | 7/2009 |
| WO | 2011/088242 A1 | 7/2011 |
| WO | 2013025260 A1 | 2/2013 |
| WO | 2013188837 A1 | 12/2013 |
| WO | 2013188849 A1 | 12/2013 |
| WO | 2014133619 A1 | 9/2014 |

OTHER PUBLICATIONS

Australian Patent Office (ISA) International Search Report and Written Opinion for PCT/US2013/073816, dated Mar. 13, 2014, 17 pages.
Machine Translation of Japan Patent Application Publ. No. 2007-209955—Takeo, Yoshida, (Aug. 23, 2007), Abstract, Description and Claims. 38 pp.
Machine translation of European Patent Publ. EP1859852A1 (Nov. 28, 2007) entitled "Removal of hydrophile substances from biodiesel using membranes" (abstract, description and claims)—15 pp.
European Patent Office, Extended European Search Report for European Patent Appl. No. 13803446.7 (PCT/US2013/046007) dated May 19, 2015. 7 pp.
European Patent Office, Extended European Search Report for European Patent Appl. No. 13804988.7 (PCT/US2013/046026 dated Jun. 17, 2015. 7 pp.
European Patent Office, Extended European Search Report for European Patent Appl. No. 11733393.0 (PCT/US2011021185) dated Sep. 16, 2015. 8 pp.
Australian Patent Office (ISA) International Search Report and Written Opinion for PCT/US2011/021185, dated Apr. 8, 2011, 21 pages.
International Preliminary Report on Patentability for PCT/US2011/021185, dated Jul. 17, 2012, 13 pages.
Korean Intellectual Patent Office (ISA) International Search Report and Written Opinion for PCT/US2013/046026, dated Sep. 23, 2013, 13 pages.
European Patent Office, Extended European Search Report for EP 13876440.2 dated Jan. 26, 2016—8 pp.
Non-Final Office Action Mailed Jun. 30, 2016, for U.S. Appl. No. 14/100,186, 8 pages.
Extended European Search Report mailed May 17, 2016, for European Patent Application No. 13876440.2. 13 pages.
U.S. Appl. No. 14/100,186, filed Dec. 9, 2013, Notice of Allowance mailed Jan. 12, 2017, all pages.

* cited by examiner

OIL QUALITY USING A MICROPOROUS HOLLOW FIBER MEMBRANE

CROSS-REFERENCE TO RELATED APPLICATIONS

This application claims priority to U.S. Provisional Application Ser. No. 61/769,286, filed Feb. 26, 2013, the entire contents of which are incorporated herein by reference.

TECHNICAL FIELD OF THE INVENTION

The present invention relates in general to the field of improving oil quality, and more particularly, to improving oil quality and the performance of a microporous hollow fiber membrane contactor.

STATEMENT OF FEDERALLY FUNDED RESEARCH

None.

BACKGROUND OF THE INVENTION

Without limiting the scope of the invention, its background is described in connection with reducing the level of impurities in oils and improving oil recovery and reclamation.

U.S. Pat. No. 8,128,827, issued to Gallo, et al., teaches a modular oil-based sludge separation and treatment system. Briefly, this patent discloses a method of recovering oil from oil-based sludge including the steps of homogenizing an oil-rich phase, a water-rich phase, and a solids-rich phase of an oil-based sludge, removing particulates from the oil-based sludge as the sludge traverses a shaker screen, heating the sludge, injecting a chemical into the heated sludge and mixing the chemical with the heated sludge, separating the phases of the chemically-treated sludge into a solids component stream, a water component stream, a first oil component stream, and a gas component stream, removing solids from the first oil component stream with a decanting centrifuge to form a second oil component stream, and removing water and solids from the second oil component stream with a disk stack centrifuge.

U.S. Pat. No. 7,186,344, issued to Hughes is directed to a membrane-based fluid treatment system. Briefly, this patent teaches a process for removing soluble and insoluble inorganic, organic, and microbiological contaminants from a fluid stream employing a pretreatment module, a post-treatment module, a recycle stream module or any combination thereof, and a membrane module. The process reduces the problems associated with membrane fouling and increases contaminant removal capacity.

United States Patent Application No. 2010/0173806, filed by Fan, et al., is directed to the extraction of hydrocarbons from hydrocarbon-containing materials and includes a method of extracting hydrocarbon-containing organic matter from a hydrocarbon-containing material includes the steps of providing a first liquid comprising a turpentine liquid; contacting the hydrocarbon-containing material with the turpentine liquid to form an extraction mixture; extracting the hydrocarbon material into the turpentine liquid; and separating the extracted hydrocarbon material from a residual material not extracted.

United States Patent Application No. 2005/0098504 filed by Manz, et al., is directed to an oil and gas well fracturing (frac) water treatment process. Briefly, a novel process for treating and removing undesirable impurities from oil and gas well fracturing fluid is disclosed. For example, a method for treating fracturing water is taught comprising: (a) passing contaminated fracturing water containing solids and liquid through a mechanical separator to remove solids from the liquid; (b) treating the fracturing water liquid with an alkaline agent to increase the pH of the liquid to a level of above 9; (c) adding a coagulant to the fracturing water to form an agglomerate and separating the agglomerate from the fracturing water; (d) reducing the pH of the fracturing water of step (c) to a level of less than about 5.5; and (e) adding an oxidizing agent to the fracturing water of step (d) to oxidize oxidizable impurities in the fracturing water.

SUMMARY OF THE INVENTION

The present invention removes oil insoluble impurities, such as water and solids, from oil, thereby improving the commercial value of the oil. In one embodiment, the present invention includes a system for improving oil quality of a contaminated oil mixture, comprising: a source of contaminated oil; and a membrane contactor system having one or more membrane contactors having a first and a second surface, wherein at least one of the first or second surfaces coalesce one or more oils from the contaminants in the oil on the opposite surface, wherein the membrane contactor has been pre-treated with a soak in a hydrophobic liquid, wherein the membrane contactor system removes contaminants that include at least one of a lipophobic liquid, a solid or both from the contaminated oil, wherein the lipophobic liquid, the solid or both is separated from the oil and the soak improves the life-time and performance of the membrane contactor. In one aspect, the system further comprises a solid removal system for removing small, medium and large solids from a oil/water mixture to form an oil and water stream containing only solids smaller than 30 microns, wherein the small, medium or large solids are removed with at least one of a sand filter, a rock filter, a porous ceramic material, a centrifuge, a mesh, a particulate filter, a sieve, a strainer, or gravity. In another aspect, the contaminated oil is at least one of an oil-rich stream, crude oil, transportation fuel, heating oil, refined petroleum products, petrochemicals, bio-oils, renewable oils, vegetable oils, reclaimed oils, waste oils, oil sands tailings oil industry liquid streams, oil contaminated water or brine, drilling mud, produced water and oil sands tailings. In another aspect, the contaminated oil is at least one of: not subjected to gravity separation prior to processing, subjected to gravity separation prior to processing, or subjected to centrifugation prior to processing. In another aspect, the membrane contactor is pre-treated with a soak that is defined further as comprising an oil soak or circulation of the membrane contactor with the hydrophobic liquid on at least one of the first, the second, or both the first and second surfaces of the membrane contactor. In another aspect, the membrane contactor is pre-treated with a soak that is defined further as comprising contacting at least one of the first, the second, or both the first and second surfaces of the membrane contactor with an alcohol, followed by a caustic, followed by an acid, followed by drying with an inert gas, followed by an oil soak or circulation of the membrane contactor with the hydrophobic liquid. In another aspect, the contaminated oil is processed by the system within 1, 2, 4, 6, 8, 12, 24, 26, 48 or 72 hours from removal of large solids. In another aspect, the membrane contactor is a hydrophobic membrane or membrane module that comprises hollow fiber microporous membranes. In another aspect, the membrane contactor is a hydrophobic hollow fiber membrane comprised of polyethylene, polypropylene, polyolefins, polyvinyl chloride (PVC), amorphous polyethylene terephthalate (PET), polyolefin copolymers, poly(etheretherketone) type polymers, surface modified polymers, mixtures or combinations thereof or a surface modified polymer that comprises polymers modified chemically at one or more halogen groups by corona discharge or by ion embedding techniques. In another aspect, the oil separated from the contaminated oil by the membrane contactor is comingled with a counterflowing fluid, wherein the at least one counterflowing fluid selected from hydrophobic liquid, non-polar fluid, alkanes such as hexane, aromatic fluid such as benzene, toluene, ethers such as diethyl ether, halogenated fluid such as chloroform, dichloromethane, and esters such as ethyl acetate, or oil recovered using a hollow fiber contactor or another method. In another aspect, the second surface is in contact with a counterflowing fluid, which can be an oil previously recovered using a hollow fiber contactor or another method. In another aspect, the system further comprises a membrane cleaning system that removes debris that clogs the membrane contactor system, and optionally comprising a clog detector that detects a clog at the membrane contactor system. In another aspect, the hydrophobic liquid is selected from at least one of mineral oil, vegetable oil, diesel fuel or oil, kerosene, naphtha, petroleum, or aromatic or aliphatic hydrocarbons containing four or greater carbon atoms. In another aspect, the isoparaffinic hydrocarbon is isopar L, isopar C, isopar E, isopar G, isopar H, isopar K, isopar M, or isopar V. In another aspect, the isoparaffinic hydrocarbon is a synthetic isoparaffinic hydrocarbon. In another aspect, the soak is for at least 5, 10, 20, 30, 40, 50, 60, 90, 120, 150 minutes, 0.1, 0.2, 0.3, 0.5, 1, 2, 3, 4, 5, 6, 7, 10, 14, 18, 20, 25, or 30 days.

Another embodiment of the present invention includes a method for removing contaminants from a contaminated oil comprising the steps of: pretreating a membrane contactor system having a first and a second surface with a hydrophobic liquid, wherein the hydrophobic liquid is contacted to at least one of the first and second surfaces; obtaining a contaminated oil that comprises oil and lipophobic contaminants; contacting the contaminated oil onto a first surface of one or more membrane contactors to coalesce the oil on the first surface; and collecting the coalesced oil from the contaminated oil on the second surface of the membrane contactor. In one aspect, the method further comprises a solid removal system for removing small, medium and large solids from a oil/water mixture to form an oil and water stream containing only solids smaller than 30 microns, wherein the small, medium or large solids are removed with at least one of a sand filter, a rock filter, a porous ceramic material, a centrifuge, a mesh, a particulate filter, a sieve, a strainer, or gravity. In another aspect, the source of the contaminated oil is at least one of an oil-rich stream, crude oil, transportation fuel, heating oil, refined petroleum products, petrochemicals, bio-oils, renewable oils, vegetable oils, reclaimed oils, waste oils, oil sands tailings oil industry liquid streams, oil contaminated water or brine, drilling mud, produced water and oil sands tailings. In another aspect, the contaminated oil is at least one of: not subjected to gravity separation prior to processing, subjected to gravity separation prior to processing, or subjected to centrifugation prior to processing. In another aspect, the membrane contactor is pre-treated with a soak that is defined further as comprising an oil soak or circulation of oil in the membrane contactor with the hydrophobic liquid on at least one of the first, the second, or both the first and second surfaces of the membrane contactor. In another aspect, the membrane contactor is pre-treated with a soak that is defined further as comprising contacting at least one of the first, the second, or both the first and second surfaces of the membrane contactor with an alcohol, followed by a caustic, followed by an acid, followed by drying with an inert gas, followed by an oil soak or circulation of the membrane contactor with the hydrophobic liquid. In another aspect, the contaminated oil is processed by the system within 1, 2, 4, 6, 8, 12, 24, 26, 48 or 72 hours from removal of large solids. In another aspect, the membrane contactor is a hydrophobic membrane or membrane module comprising hollow fiber microporous membranes. In another aspect, the membrane contactor is a hydrophobic hollow fiber membrane comprising polyethylene, polypropylene, polyolefins, polyvinyl chloride (PVC), amorphous polyethylene terephthalate (PET), polyolefin copolymers, poly(etheretherketone) type polymers, surface modified polymers, mixtures or combinations thereof or a surface modified polymer that comprises polymers modified chemically at one or more halogen groups by corona discharge or by ion embedding techniques. In another aspect, the oil separated from the contaminated oil by the membrane contactor is coalesced with a counterflowing fluid, wherein the at least one counterflowing fluid selected from non-polar fluid, alkanes such as hexane, aromatic fluid such as benzene, toluene, ethers such as diethyl ether, halogenated fluid such as chloroform, dichloromethane, and esters such as ethyl acetate. In another aspect, the second surface is in contact with a counterflowing fluid, which can be an oil previously recovered using a hollow fiber contactor. In another aspect, the method further comprises a membrane cleaning system that removes debris that clogs the membrane contactor system, and optionally comprising a clog detector that detects a clog at the membrane contactor system. In another aspect, the hydrophobic liquid is selected from at least one of mineral oil, vegetable oil, diesel fuel or oil, kerosene, naphtha, petroleum, or aromatic or aliphatic hydrocarbons containing four or greater carbon atoms. In another aspect, the isoparaffinic hydrocarbon is isopar L, isopar C, isopar E, isopar G, isopar H, isopar K, isopar M, or isopar V. In another aspect, the isoparaffinic hydrocarbon is a synthetic isoparaffinic hydrocarbon. In another aspect, the soak is for at least 5, 10, 20, 30, 40, 50, 60, 90, 120, 150 minutes, 0.1, 0.2, 0.3, 0.5, 1, 2, 3, 4, 5, 6, 7, 10, 14, 18, 20, 25, or 30 days. In another aspect, following use of the membrane the performance of the membrane degrades, wherein the membrane is washed using an acid, base and alcohol wash, the membrane is soaked in the hydrophobic liquid thereby increasing the flux rate of the hydrophobic membrane or membrane module by at least 10%. In another aspect, the step of contacting the hydrophobic membrane or membrane module with the hydrophobic liquid increases the flux rate by at least 10, 11, 12, 13, 14, 15, 20, 25, 30, 35, 40, 50, 60, 70, or 75%.

Yet another embodiment of the present invention includes a method for lengthening the life of a hydrophobic membrane or membrane module comprising the steps of: obtaining a hydrophobic membrane or membrane module; and soaking the hydrophobic membrane or membrane module in an hydrophobic liquid prior to use or once the performance of the membrane has degraded, wherein the soak increases the flux rate of the hydrophobic membrane or membrane module by at least 10%. In certain non-limiting examples, the soak increases the flux rate of the hydrophobic membrane or membrane module by at least 10, 11, 12, 13, 14, 15, 20, 25, 30, 35, 40, 50, 60, 70, or 75%. In another aspect, the hydrophobic liquid is selected from at least one of mineral oil, vegetable oil, diesel fuel or oil, kerosene, naphtha, petroleum, or aromatic or aliphatic hydrocarbons containing four or greater carbon atoms. In one aspect, the isoparaffinic hydrocarbon is isopar L, isopar C, isopar E, isopar G, isopar H, isopar K, isopar M, or isopar V. In another aspect, the isoparaffinic hydrocarbon is a synthetic isoparaffinic hydrocarbon. In another aspect, the soak is for at least 5, 10, 20, 30, 40, 50, 60, 90, 120, 150 minutes, 0.1, 0.2, 0.3, 0.4, 0.5, 0.6, 0.7, 0.8, 0.9, 1, 2, 3, 4, 5, 6, 7, 10, 14, 18, 20, 25, or 30 days. In another aspect, after the membrane performance has degraded by at least 50%, further comprising the steps of removing solid and liquids from the hydrophobic membrane or membrane module; and soaking the hydrophobic membrane or membrane module in the hydrophobic liquid for a time sufficient to improve membrane performance to at least 75%.

In another embodiment, the present invention includes an apparatus for improving oil quality of a contaminated oil mixture, comprising: a source of contaminated oil; and a membrane contactor system connected to the source of contaminated oil, the membrane contactor system comprising one or more membrane contactors having a first and a second surface, wherein the first surface coalesces oil from the contaminants in the contaminated oil, and the oil is collected on the second surface, wherein the membrane contactor has been pre-treated with a soak in an oil, wherein the soak improves the useful life-time and performance of the one or more membrane contactors. In another aspect, the hydrophobic liquid is selected from at least one of mineral oil, vegetable oil, diesel fuel or oil, kerosene, naphtha, petroleum, or aromatic or aliphatic hydrocarbons containing four or greater carbon atoms.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
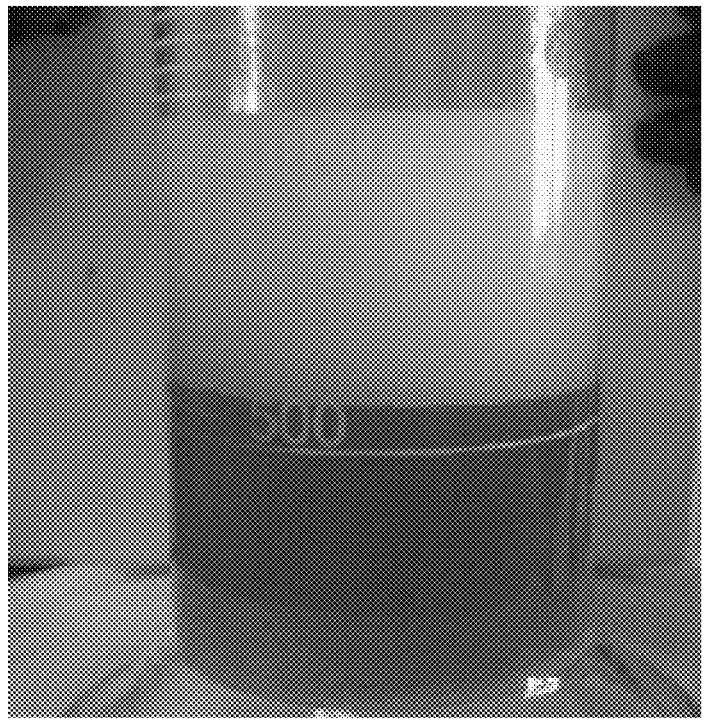
FIG. 1 shows the remnants of an oil/water mixture after application of the present invention. The lower layer is water removed from the oil/water mixture and the upper layer is the small volume of the remaining oil/water mixture from the shell side of the membrane at the conclusion of the process that was not separated during the operation.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Previously, the present inventors have developed U.S. patent application Non-methods for insoluble oil recovery from aqueous slurries. For example, U.S. Patent Application No. 20110174734, filed by Seibert, et al. teaches the development and application of a novel non-polar oil recovery process utilizing a non-dispersive oil recovery method to coalesce and recover oil from a bio-cellular aqueous slurry is described herein, relevant portions incorporated herein by reference. The process can be used to recover algal oil from a lysed algae slurry, recovery of Omega fatty acids from a bio-cellular aqueous feed, recovery of Beta-carotene from a bio-cellular aqueous feed and for the removal of oil from produced water in oil production and similar type applications that would typically be conducted by gravity settling or centrifugation. The technique of the present invention utilizes a microporous hollow fiber (MHF) membrane contactor. The novel non-polar oil recovery process described herein can be coupled to a collecting fluid (a non-polar fluid such as heptane, a biodiesel mixture or the previously recovered oil) that is circulated through the hollow fiber membrane. In cases where the previously recovered oil is used the recovered oil does not have to be separated from the collection fluid, and separation costs can be eliminated.

Yet another example by the present inventors includes methods and systems for non-dispersive insoluble oil recovery from aqueous slurries. U.S. Patent Application No. 20120184759, filed by Kipp, et al., teaches the development and application of a novel non-polar oil recovery process utilizing a non-dispersive fluid method to coalesce and recover oil from a lysed or non-lysed Yeast slurry using a microporous hollow fiber (MHF) membrane contactor, relevant portions incorporated herein by reference. More particularly, the present inventors teach methods and systems for recovering one or more insoluble oils from a liquid source that comprises insoluble oils and yeast, comprising using one or more non-dispersive membrane contactors, comprising the steps of: pumping the liquid source comprising the one or more oils from a reactor to the contactor;

pumping a collection fluid through the one or more contactors; contacting the one or more oils in the liquid source with the collection fluid pumped in the one or more contactors; pumping a first stream from the contactor back to the reactor, wherein the first stream comprises the liquid source with the Yeast without recovered oils, wherein the Yeast remain viable; and removing a second stream from the contactor or the vessel, wherein the second stream comprises the collection fluid and recovered oils.

Another example by the present inventors includes additional methods and systems for non-dispersive isolation and insoluble oil recovery from aqueous slurries. In this example, U.S. Patent Application No. 20120208247 (relevant portions incorporated herein by reference), includes methods and systems for removing one or more insoluble oils from a liquid source, comprising one or more organisms, using one or more non-dispersive membrane contactors, comprising the steps of: pumping the liquid source comprising the one or more oils from a reactor to the contactor; pumping a collection fluid through the one or more contactors; contacting the one or more oils in the liquid source with the collection fluid pumped in the one or more contactors; pumping a first stream from the contactor back to the reactor, wherein the first stream comprises the liquid source with the one or more organisms without removed oils, wherein the one or more organisms remain viable; and removing a second stream from the contactor or the vessel, wherein the second stream comprises the collection fluid and removed oils.

The method of the present invention includes a process to exclude oil insoluble materials from oil-rich liquid sources, e.g., crude oil, transportation fuel, heating oil, refined petroleum products, petrochemicals, bio-oils, renewable oils, vegetable oils, reclaimed oils, waste oils or oil sands tailings as non-limiting examples. In addition, oil-rich sources include fluids produced from oil and gas operations that include water, brine, sand, rocks and other oil insoluble liquids and solids that comprise hydrocarbons that the user wants to recover or remove from the oil-rich source. The oil-rich liquid stream may result from a process that involves initial steps to remove physically large solids by gravity settling, filtration and/or centrifugation as non-limiting examples. The size restriction on the solids is required to efficiently complete the removal of oil insoluble materials. Physically small solids (less than approximately 30 uM) can pass into the shell side of the hollow fiber contactor, but in order to pass through the pores to the tube side, the solids would have to be less than approximately 50 nM. In practice, solids are too physically large to pass through the pores.

The process allows water removal from liquid oil sources, non-limiting examples such as oil industry wastes, crude oil, transportation fuel, heating oil, refined petroleum products, petrochemicals, bio-oils, renewable oils, vegetable oils, reclaimed oils, waste oils or oil sands tailings. Currently, oil is recovered by skimming following gravity settling or centrifugation in combination often with up-front filtration, chemical addition or the like. A non-dispersive membrane contactor is not currently used to promote more rapid or efficient oil recovery or clean up. As used herein, the term "contaminated oil" encompasses an oil stream or pool that may contain one or more of the following in any combination; oils (hydrocarbons and hydrocarbon-rich molecules of commercial value), and, clay, rocks, sand, cells and/or cellular debris, insoluble particulates having diameters from, e.g., 100 nm to 1000 micrometers, water, brine, salts, gums, drilling fluids or muds, solvents, lipophobic agents, lipophilic agents, inorganic or organic: molecules, oligomers or polymers, solvents, and/or surfactants. In certain examples, the "contaminated oil" is an oil that is an "off-spec" oil or fuels that can not be sold for the same price, and many require clean up prior to sale. Because "off-spec" oil has diminished value, the present invention has immediate use in oil clean up, with diverse, large commercial applications.

As used herein, the term "oil" refers to, e.g., hydrocarbon or hydrocarbon-rich molecules including a complex mixture of petrochemicals, lipids, hydrocarbons, fatty acids, triglycerides, aldehydes, etc. The compounds included herein may be from, e.g., $C_8$ (jet fuel compatible) up to $C_{60}$ (motor oil compatible) or larger. As used herein, a "membrane contactor" refers to a hydrophobic microporous hollow fiber membrane. Non-limiting examples of membrane contactors include hydrophobic membrane or membrane module that comprises hollow fiber microporous membranes, e.g., hydrophobic hollow fiber membrane made from polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof.

As used herein, the term "hydrophobic liquid" refers to liquids that are partially or completely water immiscible and that when contacted to the hydrophobic membranes or membrane contactors improve the lifetime of the membrane. Non-limiting examples of hydrophobic liquids for use with the present invention include mineral oil, vegetable oil, diesel fuel or oil, kerosene, naphtha, petroleum, or aromatic or aliphatic hydrocarbons containing four or greater carbon atoms. In one non-limiting example, the hydrophobic liquid can be one or more isoparaffinic hydrocarbon selected from at least one of isopar L, isopar C, isopar E, isopar G, isopar H, isopar K, isopar M, or isopar V, or synthetics thereof.

The system can also include, but does not require a collection fluid, which can be a hydrophobic liquid, a solvent, diesel or biodiesel, oil, or mixtures thereof.

This new method teaches that liquid sources that are predominately oil that is contaminated can be "cleaned" using a microporous hollow fiber membrane. Water in oil emulsions, for example, can be separated, in which a high purity oil is generated from a mixture of oil with oil insoluble liquid (or solids, see below). The oil in the mixture is separated by passing through the membrane; the water is left behind. This technique could be applied in various applications to remove water from oil. In addition, the method will separate solids from oil, because the solids are too small to traverse the microscopic pores in the hollow fiber membrane that the oil passes through. Thus, an oil mixed with insoluble solids and water can be passed through the hollow fiber membrane and an oil stream substantially devoid of water and solids will be recovered. The system can be operated in a mode in which the water removed from the oil stream accumulates and is drained to allow continuous operation.

A water in oil emulsion was separated by exposure to a hollow fiber membrane. The oil passed through the membrane and was recovered on the tube side; the water remained on the shell side of the module. FIG. 1 shows the remnants of the oil on the shell side after draining. The water in oil emulsion (top layer) still exists, but much of the water has been separated from the water and is now free water (bottom layer).

TABLE 1

Pure Oil Flux Test Results
X50

| | |
|---|---|
| 3 | gallons per minute |
| 11.355 | liters per minute |
| 10 | Psid |
| 130 | seconds to 4 L, Trial 1 |
| 130 | seconds to 4 L, Trial 2 |
| 20 | m^2 surface area |
| 1.538 | flux rate (mL per m^2 per second) |
| 16% | % flux |
| 1.846 | L per minute |

TABLE 2

Pure Oil Flux Test Results
X50

| | |
|---|---|
| 3.76 | gallons per minute |
| 14.2316 | liters per minute |
| 30 | psid |
| 43 | seconds to 4 L, Trial 1 |
| 43 | seconds to 4 L, Trial 2 |
| 20 | m^2 surface area |
| 4.651 | flux rate (mL per m^2 per second) |
| 39% | % flux |
| 5.58 | L per minute |

TABLE 3

Pure Oil Flux Test Results
X50

| | |
|---|---|
| 0 | gallons per minute |
| 0 | liters per minute |
| 50 | psid |
| 27 | seconds to 4 L, Trial 1 |
| 27 | seconds to 4 L, Trial 2 |
| 20 | m^2 surface area |
| 7.407 | flux rate (mL per m^2 per second) |
| 8.89 | L per minute |

| pressure | L per minute |
|---|---|
| 10 | 1.846 |
| 30 | 5.58 |
| 50 | 8.89 |

TABLE 4

Pure Oil Flux Test Results
X40

| | |
|---|---|
| 3.1 | gallons per minute |
| 11.7335 | liters per minute |
| 12.5 | psid |
| 669 | seconds to 4 L, Trial 1 |
| 649 | seconds to 4 L, Trial 2 |
| 20 | m^2 surface area |
| 0.298953662 | flux rate (mL per m^2 per second) |
| 3% | % flux |
| 0.359 | L per minute |

TABLE 5

Pure Oil Flux Test Results
X40

| | |
|---|---|
| 3.9 | gallons per minute |
| 14.7615 | liters per minute |
| 30 | psid |
| 232 | seconds to 4 L, Trial 1 |
| 234 | seconds to 4 L, Trial 2 |
| 20 | m^2 surface area |
| 0.854700855 | flux rate (mL per m^2 per second) |
| 7% | % flux |
| 1.03 | L per minute |

TABLE 6

Pure Oil Flux Test Results

| | |
|---|---|
| 0 | gallons per minute |
| 0 | liters per minute |
| 50 | psid |
| 140 | seconds to 4 L, Trial 1 |
| 138 | seconds to 4 L, Trial 2 |
| 20 | m^2 surface area |
| 1.438848921 | flux rate (mL per m^2 per second) |
| | % flux |
| 1.74 | L per minute |

X40

| pressure | L per minute |
|---|---|
| 12.5 | 0.359 |
| 30 | 1.03 |
| 50 | 1.74 |

Figure 2:
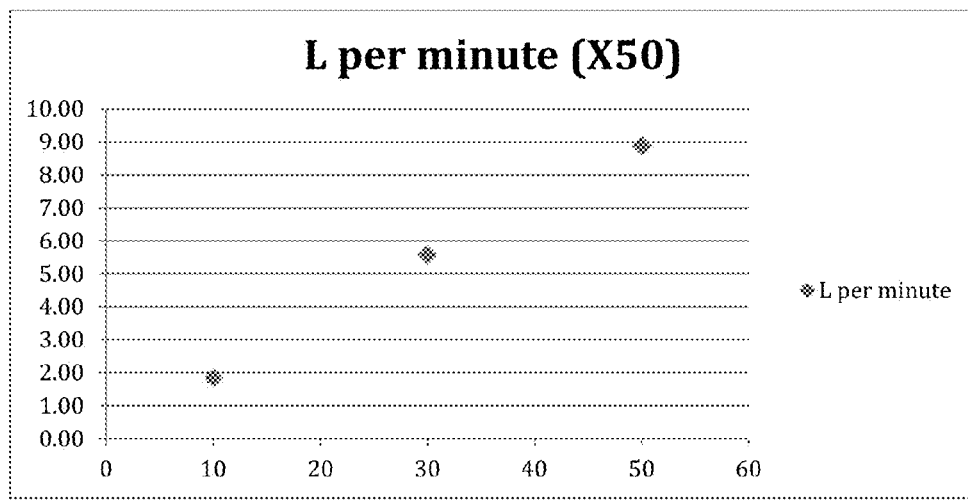
FIG. 2 is a graph that shows flux test results using an X50 hollow fiber membrane contactor with 20 m$^2$ surface area. Isopar L was flowed on the shell side of the membrane at up to 4 gallons per minute (~15.1 L per minute) at a range of pressures. Oil that passed through the membrane to the tube side was collected. The flux rate is determined based on the oil volume recovered from the tube side per minute.
Figure 3:
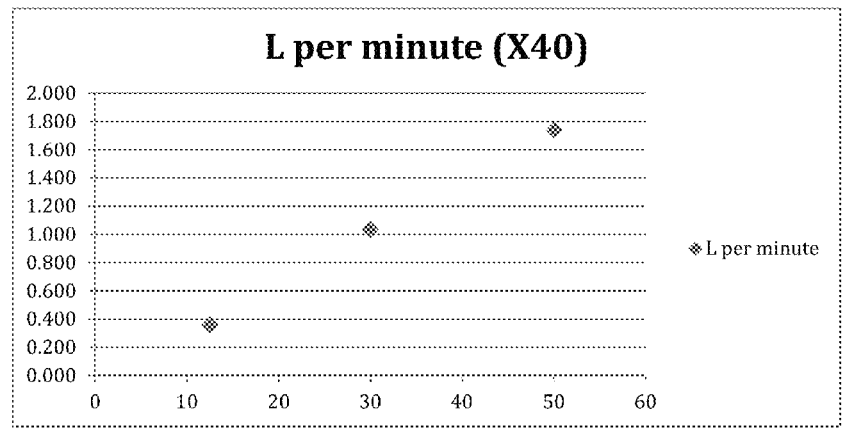
FIG. 3 is a graph that shows flux test results using an X40 hollow fiber membrane contactor with 20 m$^2$ surface area. Isopar L was flowed on the shell side of the membrane at up to 4 gallons per minute (~15.1 L per minute) at a range of pressures. Oil that passed through the membrane to the tube side was collected. The flux rate is determined based on the oil volume recovered from the tube side per minute.

Tables 1 to 3 shows the flux test parameters and the results of the pure oil flux using the present invention using an X50 membrane system. Tables 4 to 6 shows the flux test parameters and the results of the oil separation using the present invention using an X40 membrane system. The results of the flux tests from Tables 1 to 3 and Tables 4 to 5 are summarized in the graphs of FIGS. 2 and 3, respectively.

Figure 4A:
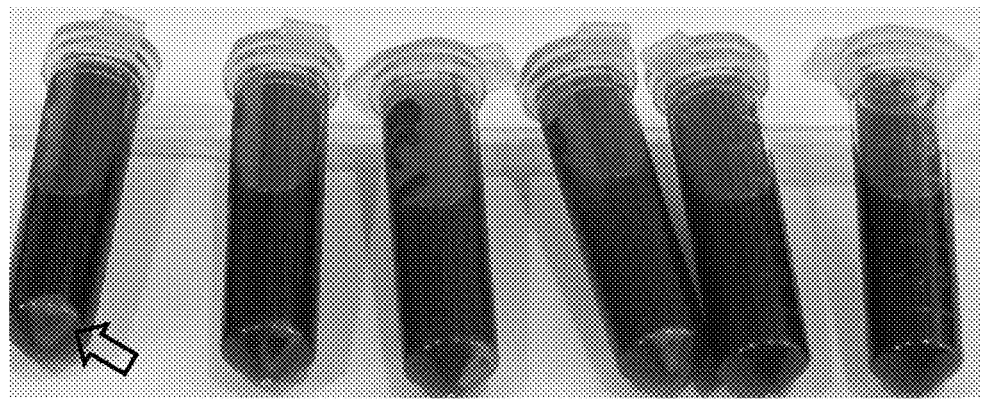
FIGS. 4A and 4B show samples of crude oil processed with the method. The samples of oil recovered from the contaminated oil have no visible solids (FIG. 4A) and no visible water (FIG. 4B).
Figure 4B:
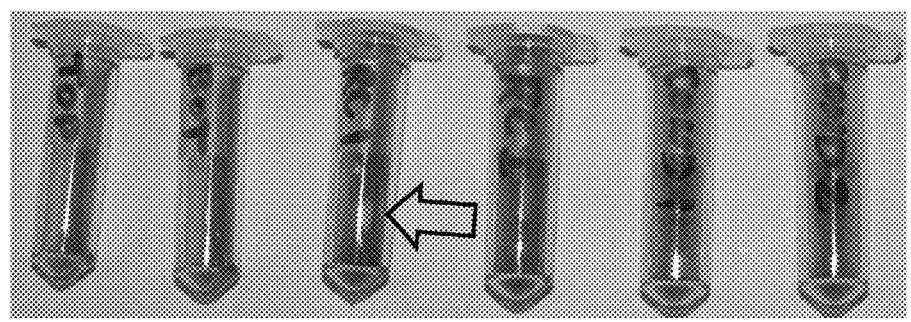

FIGS. 4A and 4B shows samples of crude oil processed with the method. Briefly, two (2) gallons of crude oil, recovered by gravity separation and skimming, were further cleaned using the membrane. The contaminated crude oil was circulated through the shell side of an X50 membrane with 1.4 m$^2$ surface area to allow the oil to coalesce to the tube side; the contaminants were left on the shell side. Samples of the contaminated oil and the cleaned oil were centrifuged at 12,000×g to pellet suspended solids and observe the presence of solids and water. The samples of oil recovered from the contaminated oil have no visible solids (FIG. 4A) and no visible water (FIG. 4B).

Figure 5A:
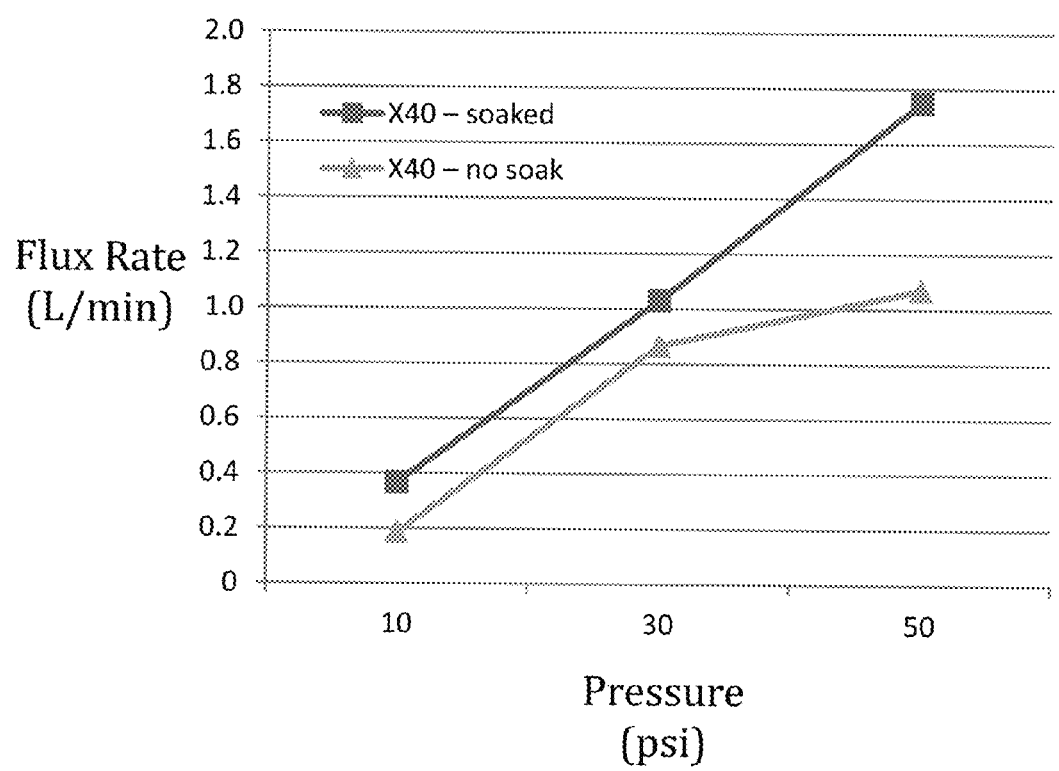
FIGS. 5A and 5B show the flux of pure isopar L through a recently cleaned X50 membrane.
Figure 5B:
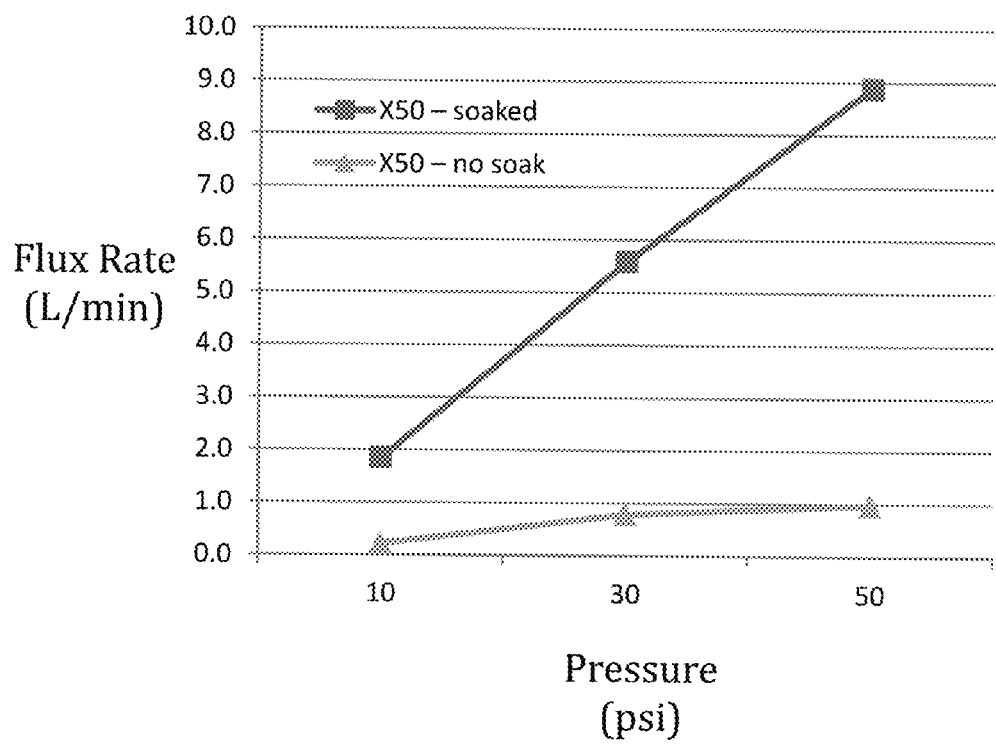

FIG. 5 shows the flux of pure isopar L through a recently cleaned X50 membrane. The membrane had been used extensively and repeatedly with complex feedstocks, and cleaned multiple times according to the manufacturer's instructions. This conventional cleaning uses sequential water, acid, base and isopropyl alcohol washes, followed by complete drying. The cleaning method is known to eventually reduce the functional lifespan of the membranes. Following cleaning, the membranes passed the manufacturer's quality control test. As shown in 5A and 5B, the oil flux rate of the clean membrane was poor, consistent with a membrane approaching the end of its useful life. At the conclusion of the initial isopar L testing, the membrane was filled with isopar L, capped and set aside for approximately three weeks. Following a three week soak in isopar L, the oil flux testing was repeated. The flux rate of the membrane was dramatically improved by the prolonged isopar L soak.

Figure 6A:
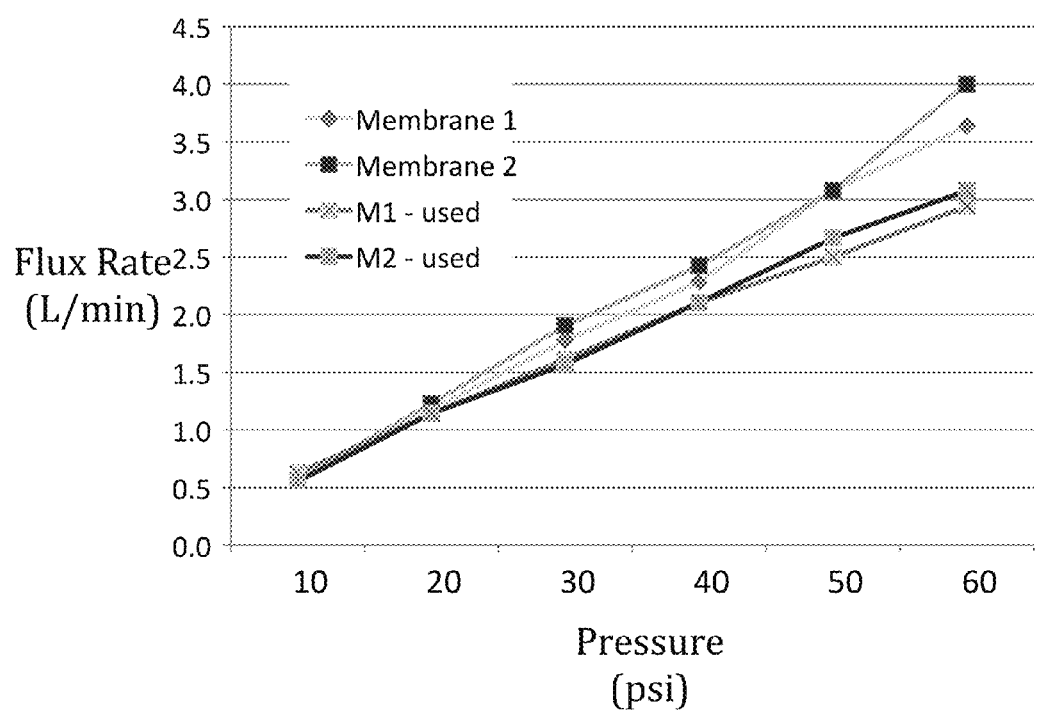
FIGS. 6A and 6B show the flux history of X40 membranes with isopar L (FIG. 6A) and the flux history of X40 membranes and performance with cleaning in accordance with the present invention (FIG. 6B).
Figure 6B:
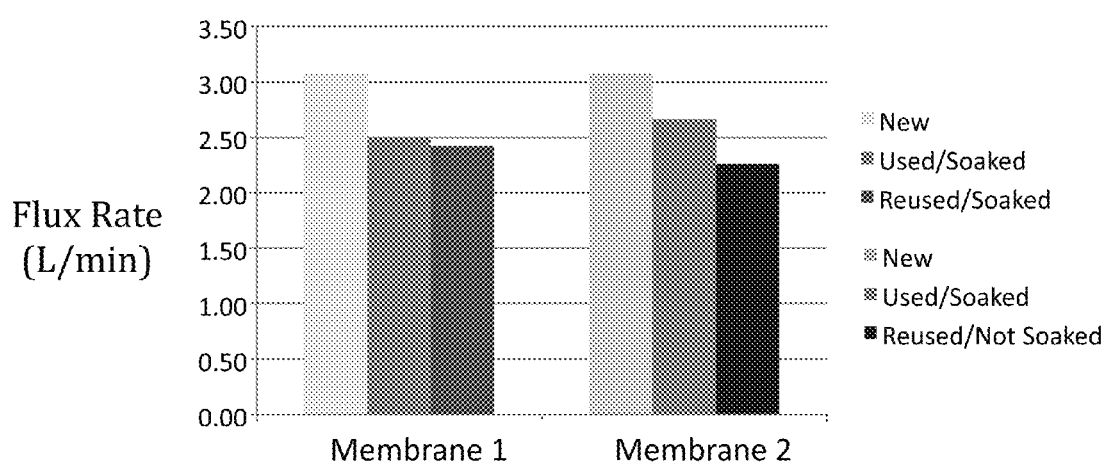

FIGS. 6A and 6B show the flux history of X40 membranes with isopar L. Membranes were tested for isopar L flux when new. The membranes were then sequentially exposed to two distinct oilfield produced waters. Following exposure to oilfield water 1, the membranes were soaked in isopar L for several days and flux testing was repeated. The conventional cleaning method was not used. These results show that after exposure to complex feedstocks, the membranes achieved flux rates approximately 75% of the rates achieved when the membranes were new (FIG. 6A). Following exposure to oilfield water 2, membrane 1 was filled with isopar L when the testing ended. By contrast, membrane 2 was capped and set aside for approximately ten days without isopar L. To clean and restore the membranes, each was conditioned with isopar L for approximately 30 minutes (1.75 gpm, 50 psi). During the conditioning, the performance of the membranes steadily improved (data not shown). At the conclusion of the conditioning, the flux rate of membrane 1 was nearly fully restored to the flux rate prior to the reuse (FIG. 6B). By contrast, membrane 2's flux was approximately 80% of the flux rate prior to the reuse. Immediate exposure to a hydrophobic liquid (isopar L) at shut down appeared to shorten the cleaning time for the membranes following oil exposure.

Figure 7:
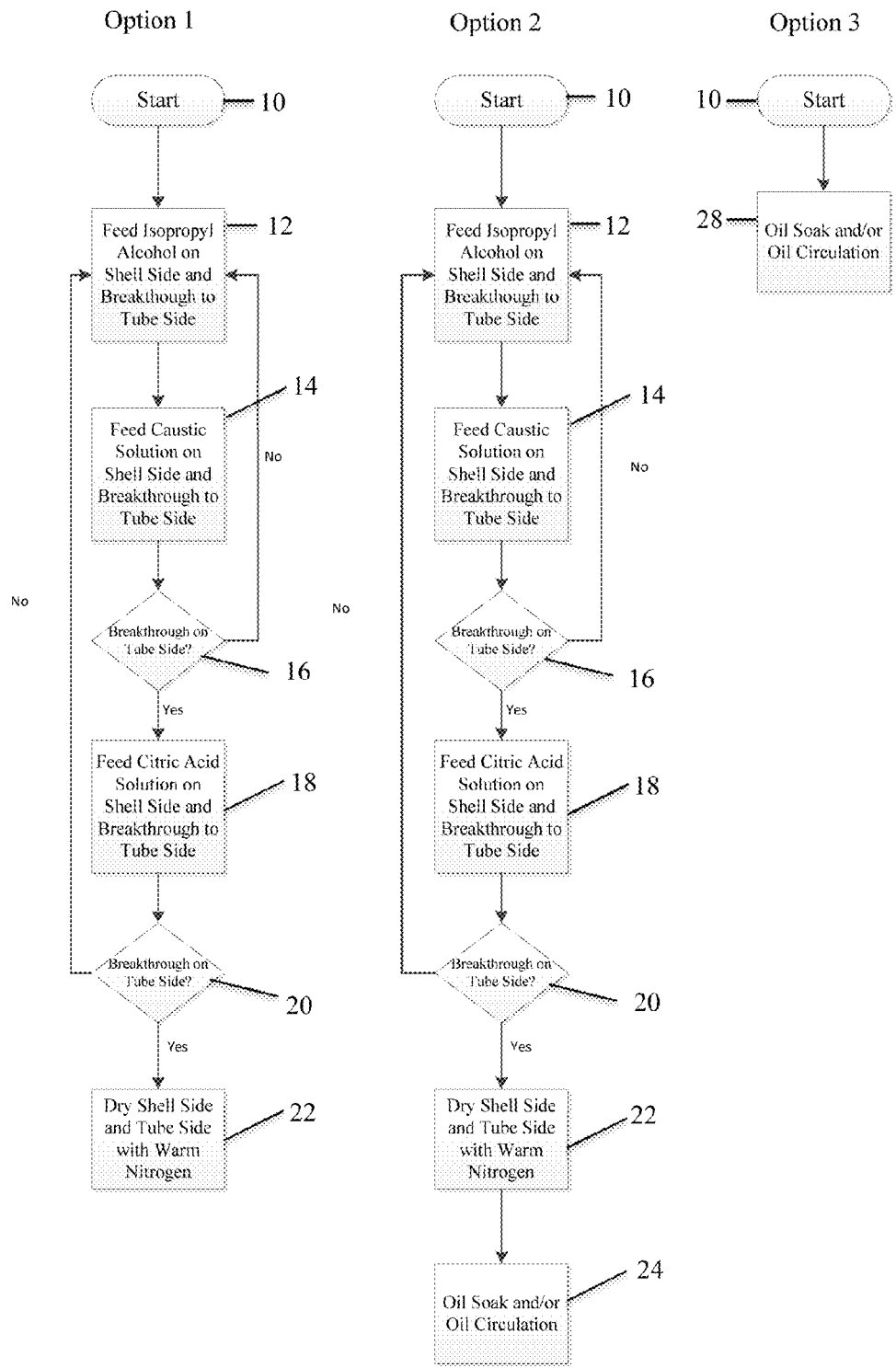
FIG. 7 shows a flow diagram of cleaning methods, comparing the manufacturer's recommended method to the modified methods established through this work.

FIG. 7 shows the flow diagrams of cleaning methods. The flowchart labeled Option 1 shows the manufacturer's recommended cleaning method. The flow diagrams labeled Options 2 and 3 shows the improved methods of the present invention that lead to an increased useful usage time of the present invention, the improved performance of the membrane once performance has degraded due to usage, or both improve useful life of the membrane and increased performance of the membrane after degradation of membrane performance but before the novel treatment of the present invention. Briefly, the methods begin with a start 10. In Options 1 and 2, which are flowcharts for a method that can be used with used membranes that have reduced performance, an alcohol wash 12 (e.g., methyl, ethyl, isopropyl or other alcohol) is used on either the shell or tube sides of the membrane (used herein interchangeably with first and second side), which is followed by a caustic wash 14 most commonly performed on the shell side of the membrane until the solution breaks-through to the tube side of the membrane. Next, if the caustic wash 14 does not lead to a breakthrough at step 16, then the alcohol wash step 12 is repeated followed by the caustic wash 14. If at step 16 the caustic solution does breakthrough to the tube side, then an acid solution 18 is then contacted with the shell side. Next, if the acid wash 18 does not lead to a breakthrough of the acid solution, then the process begins again with the alcohol wash 12. If the acid solution breaks-through to the tube side, then the membrane is washed at step 22, e.g., using an inert gas such as nitrogen. In contrast to the recommendations of the manufacturer's cleaning process, the present inventors have found a significant and surprising improvement in both the performance but also the useful life of the membrane by adding an oil-soak or circulation step 24 following the drying step 22. Based on this surprising observation, the present inventors developed a novel pre-treatment for the membrane in which, prior to any use, the membrane is pre-soaked 28 in oil or by circulating oil on the shell, tube or both sides of the membrane. The cleaning and conditioning method disclosed herein is dramatically simpler, faster and less expensive than the method recommended by the manufacturer. The method disclosed herein is also compatible with rapid, high-efficiency start up for oil removal applications. Furthermore, it is important to note that these membranes are designed for separating gases, thus, it is counterintuitive to contact the membranes with any fluid, in particular any type of oil.

Figure 8:
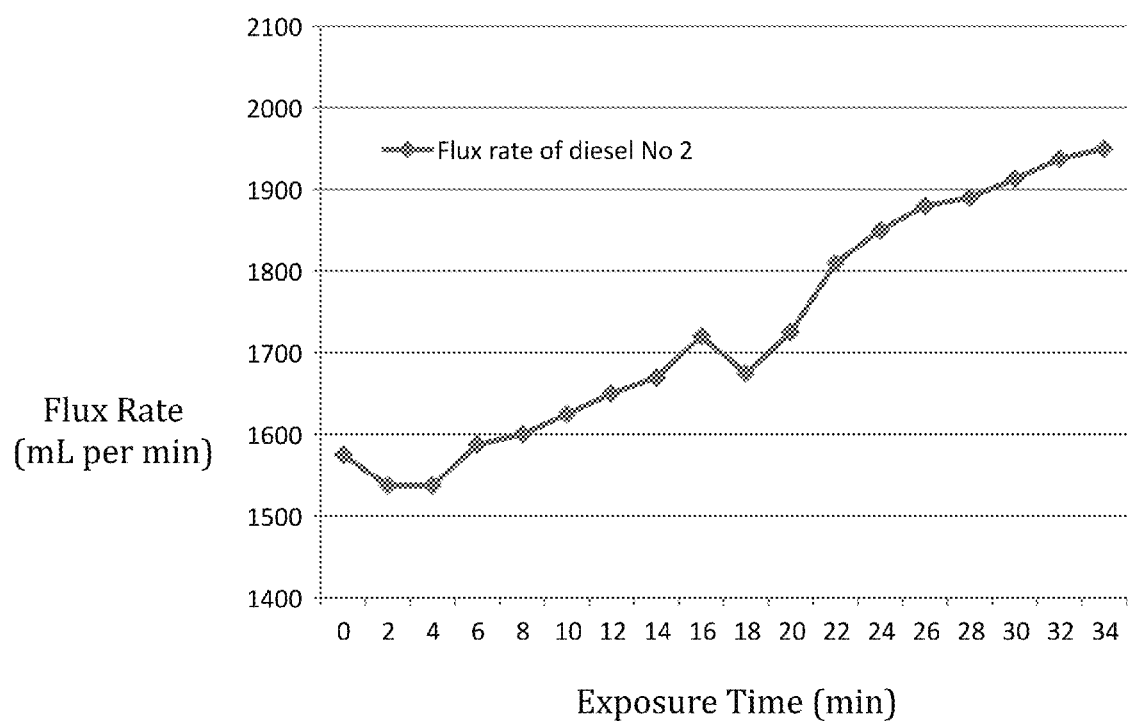
FIG. 8 shows a graph of membrane conditioning using a generic, low-cost hydrophobic liquid (diesel fuel).

FIG. 8 shows the flux of diesel fuel through a used, unclean X40 membrane. The membrane had been used with industrial wastewater containing oil. Following use, the membrane was rinsed with water, and then set aside with no further treatment. Approximately six weeks later, the membrane was completely dry. Diesel fuel was circulated through the membrane for approximately 35 minutes at a flow rate of 1.75 gpm and 50 psi. No collection fluid was used. The rate of flux of diesel fuel was monitored during the circulation by measuring the volume of diesel recovered from the tube side of the membrane every two minutes (following a brief normalization period to establish steady state operating conditions). As shown in the figure, the initial flux rate of the membrane was approximately 1580 mL per minute. The flux rate improved during continued exposure to diesel, reaching a flux rate of 1950 mL per minute after 35 minutes of continuous exposure. The flux rate of the dirty membrane improved by more than 20% during the test, establishing that a generic, low-cost hydrophobic liquid is sufficient to condition the membrane and improve function.

The skilled artisan will recognize that some streams will either have no solids or solids that already meet the size selection criteria for processing (less than 10, 20, 30, 40 or 50 microns), so the stream may not need any pre-processing. If it is the case that some of the solids will stick to the membrane and cause a clog, a cleaning processes is used to remove the solids from the membrane to continue use. The present invention may also include a clog detector that determines if the membrane contactor system has become at least partially or fully clogged. Whether or not a clog is detected (e.g., if a clog detector is not used and rather a regular or sporadic cycle or maintenance is used), the invention may also include a system or method for cleaning the membrane contactor, e.g., physical-mechanical cleaning, use of chemicals, backflow, pressurized water, brine or other solvents or other methods for removing debris from the membrane contactor system. Thus, the present invention may also include one or more systems for cleaning, flushing and regenerating the membrane.

In certain examples, the streams may have been partially or completely gravity settled and/or may be predominantly oil with solids and comparatively small amounts of water. To separate the solids from the oil it may be necessary to apply pressure to the stream as it enters the solid removal system and/or the stream may have to be heated (in one example, steam is applied to the stream to both heat the stream and increase the water content).

It was found that the present invention can be operated with or without a counterflowing collection fluid. Therefore, the systems and methods can operate with or without a collection fluid to process contaminated oil.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 8,128,827
U.S. Pat. No. 7,186,344
United States Patent Application No. 2010/0173806
United States Patent Application No. 2005/0098504

What is claimed is:

1. A method for removing contaminants from a contaminated oil comprising the steps of:
    washing a hydrophobic hollow fiber membrane of a membrane contactor system, wherein the hydrophobic hollow fiber membrane has a first surface and a second surface, and wherein washing includes:
        washing at least one of the first surface, the second surface, or both the first and second surfaces with an alcohol,
        washing at least one of the first surface, the second surface, or both the first and second surfaces with a caustic,
        washing at least one of the first surface, the second surface, or both the first and second surfaces with an acid, and
        drying the hydrophobic hollow fiber membrane using an inert gas;
    pretreating the hydrophobic hollow fiber membrane with a hydrophobic liquid by soaking the hydrophobic hollow fiber membrane in the hydrophobic liquid or circulating the hydrophobic liquid in the hydrophobic hollow fiber membrane, wherein the hydrophobic liquid is contacted to at least one of the first and second surfaces;
    obtaining a contaminated oil that comprises oil and lipophobic contaminants;
    contacting the contaminated oil onto the first surface of the hydrophobic hollow fiber membrane to coalesce the oil on the first surface; and
    collecting the coalesced oil on the second surface of the hydrophobic hollow fiber membrane.

2. The method of claim 1, further comprising filtering an oil and water mixture using a solid removal system for removing small, medium and large solids from the oil and water mixture to form a stream of the contaminated oil containing only solids smaller than 30 microns, wherein the small, medium or large solids are removed with at least one of a sand filter, a rock filter, a porous ceramic material, a centrifuge, a mesh, a particulate filter, a sieve, a strainer, or gravity.

3. The method of claim 1, wherein the contaminated oil is at least one of an oil-rich stream, crude oil, transportation fuel, heating oil, refined petroleum products, petrochemicals, bio-oils, renewable oils, vegetable oils, reclaimed oils, waste oils, oil industry liquid streams, oil contaminated water or brine, drilling mud, produced water and oil sands tailings.

4. The method of claim 1, wherein the contaminated oil is at least one of: not subjected to gravity separation prior to contacting the first surface of the hydrophobic hollow fiber membrane, subjected to gravity separation prior to contacting the first surface of the hydrophobic hollow fiber membrane, or subjected to centrifugation prior to contacting the first surface of the hydrophobic hollow fiber membrane.

5. The method of claim 1, wherein the contaminated oil is contacted to the first surface of the hydrophobic hollow fiber membrane within 1, 2, 4, 6, 8, 12, 24, 26, 48 or 72 hours from removal of large solids.

6. The method of claim 1, wherein the membrane contactor system comprises hollow fiber microporous membranes.

7. The method of claim 1, wherein the hydrophobic hollow fiber membrane comprises polyethylene, polypropylene, polyolefins, polyvinyl chloride (PVC), amorphous polyethylene terephthalate (PET), polyolefin copolymers, poly(etheretherketone) type polymers, surface modified polymers, mixtures or combinations thereof, or a surface modified polymer that comprises polymers modified chemically at one or more halogen groups by corona discharge or by ion embedding techniques.

8. The method of claim 1, wherein the collected oil is contacted with a counterflowing fluid at the second surface, wherein the counterflowing fluid is selected from the group consisting of a non-polar fluid, an alkane, hexane, an aromatic fluid, benzene, toluene, an ether, diethyl ether, a halogenated fluid, chloroform, dichloromethane, an ester and ethyl acetate.

9. The method of claim 1, wherein the second surface is in contact with a counterflowing fluid that comprises an oil previously recovered using a hollow fiber contactor.

10. The method of claim 1, further comprising cleaning a clog in the membrane contactor system using a membrane cleaning system that removes debris that clogs the membrane contactor system.

11. The method of claim 1, wherein the hydrophobic liquid is selected from at least one of mineral oil, vegetable oil, diesel fuel or oil, kerosene, naphtha, petroleum, or aromatic or aliphatic hydrocarbons containing four or greater carbon atoms.

12. The method of claim 1, wherein the hydrophobic liquid is an isoparaffinic hydrocarbon selected from at least one of isopar L, isopar C, isopar E, isopar G, isopar H, isopar K, isopar M, or isopar V, or any synthetic thereof.

13. The method of claim 1, wherein soaking the hydrophobic hollow fiber membrane in the hydrophobic liquid is for at least 0.1, 0.2, 0.3, 0.5, 1, 2, 3, 4, 5, 6, 7, 10, 14, 18, 20, 25, or 30 days.

14. The method of claim 1, wherein when a flux rate of oil through the hydrophobic hollow fiber membrane degrades, the washing and the pretreating are repeated, thereby increasing the flux rate by at least 10%.

15. The method of claim 1, wherein pretreating the hydrophobic hollow fiber membrane increases a flux rate of oil through the hydrophobic hollow fiber membrane by at least 10, 11, 12, 13, 14, 15, 20, 25, 30, 35, 40, 50, 60, 70, or 75%.

16. The method of claim 1, wherein the hydrophobic liquid comprises a same oil as the coalesced oil.

* * * * *